Feb. 26, 1946.   H. J. DE N. McCOLLUM   2,395,417
AIRCRAFT HEATING APPARATUS
Filed June 14, 1943
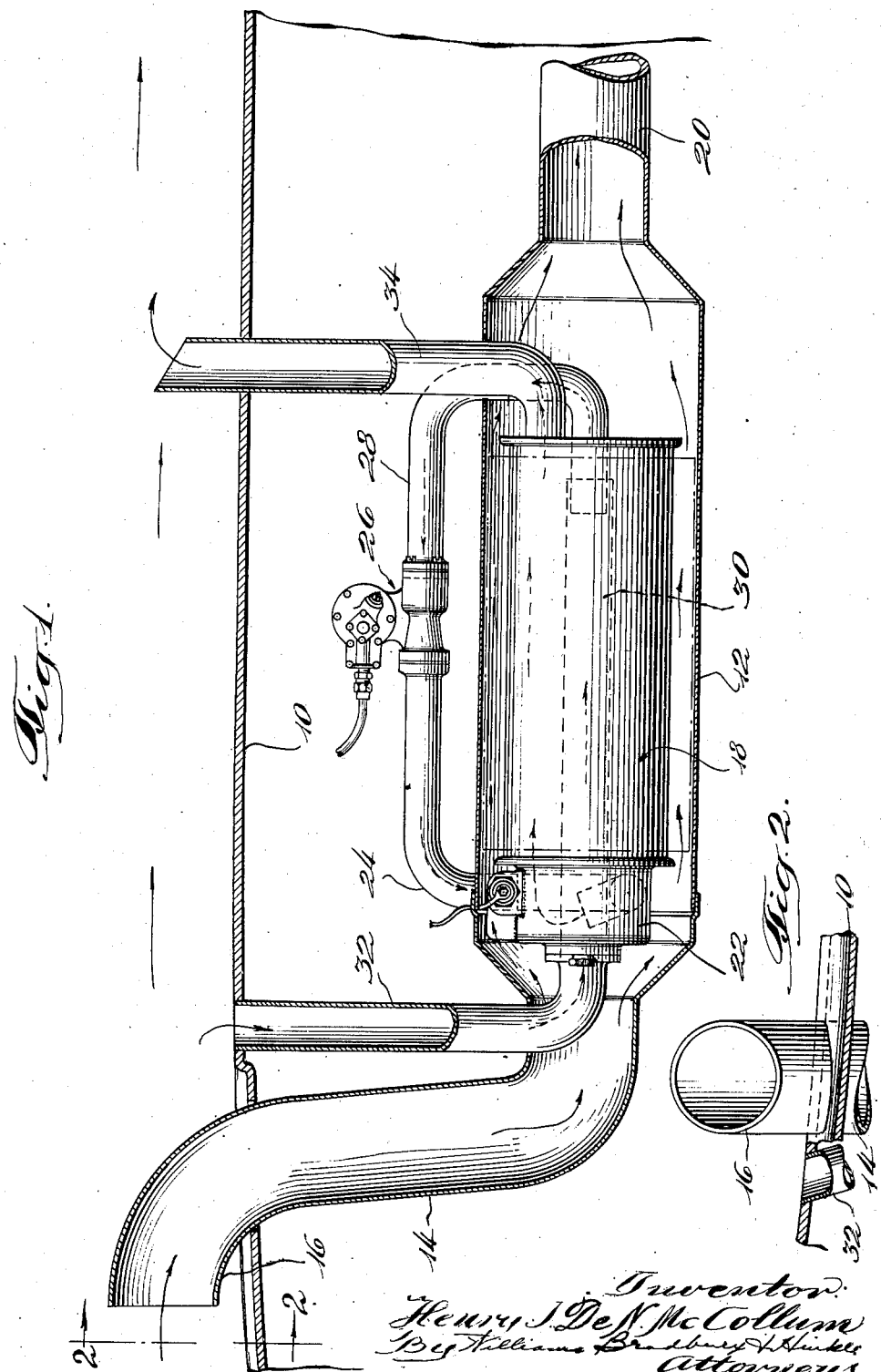
Inventor:
Henry J De N McCollum
By Williams Bradbury & Hinkle
Attorneys Patented Feb. 26, 1946

2,395,417

UNITED STATES PATENT OFFICE 2,395,417

AIRCRAFT HEATING APPARATUS

Henry J. De N. McCollum, Chicago, Ill.; Thelma McCollum executrix of said Henry J. De N. McCollum, deceased Application June 14, 1943, Serial No. 490,718

2 Claims. (Cl. 126—110)

My invention relates generally to heating apparatus, and more particularly to heaters for use in heating aircraft.

In heaters of the internal combustion type, the heat exchanger necessarily has a wall preventing admixture of the products of combustion with the ventilating air. Particularly for aircraft use, the heat exchanger must be as light as possible, and thus its walls are usually made quite thin. Due to the effects of corrosion, vibration, or enemy action, there is a possibility that the heat exchanger wall may become perforated or cracked and permit flow through it. If the pressure of the products of combustion in the heater exchanger is greater than that of the ventilating air, the products of combustion would flow through such perforation or crack and be admixed with the ventilating air. Since the products of combustion usually contain carbon monoxide and other toxic or noxious gases, such contamination of the ventilating air might readily have serious results.

It is therefore a primary object of my invention to provide an improved aircraft heating apparatus in which means are provided to maintain the pressure of the ventilating air above that of the products of combustion within the heat exchanger.

A further object is to provide an improved heating apparatus for aircraft in which the flow of ventilating air past the heat exchanger forming part of the heating apparatus is obtained through the use of a ram maintaining the ventilating air pressure above that of the atmosphere, and in which the space within the heat exchanger containing products of combustion is maintained at a pressure below that of the atmosphere.

Other objects will appear from the following description, reference being had to the accompanying drawing, in which:

Fig. 1 is a fragmentary horizontal sectional view of the heating apparatus; and

Fig. 2 is a sectional view taken on the line 2—2 of Fig. 1.

The heater is illustrated as being installed upon an aircraft having a fuselage side wall 10, the heater comprising a casing 12 connected by inlet duct 14 with a ram portion 16 opening in the direction of the flight of the plane and thus subjected to the dynamic air pressure due to the motion of the plane. The ventilating air admitted through the ram 16 flows through the casing 12 and is heated therein by a heat exchanger 18 and is conducted therefrom by a conduit 20 leading to the cabin or other space to be heated. The heat exchanger 18 is illustrated as forming part of an internal combustion type heater having a combustion chamber 22 to which a combustible mixture is supplied through an induction tube 24 from a carbureting device 26.

Air is supplied to the carbureting device 26 through a conduit 28 which receives air from a preheating tube 30. The preheating tube 30 extends through the heat exchanger 18 and is connected to an inlet duct 32 which extends through the fuselage wall 10 and the end of which lies flush with the external surface of this wall. The products of combustion resulting from the burning of the combustible mixture in the combustion chamber 22 flow through the heat exchanger 18 and are discharged to the atmosphere through an exhaust conduit 34 which extends through a suitable opening in the fuselage wall 10 and the end of which is preferably beveled as shown. The end of the discharge conduit 34 is preferably located at a portion of the air stream in which the velocity is high and hence the pressure is relatively low. A partial vacuum is thus created in the exhaust conduit 34 while the plane is in flight.

The heater may be electrically ignited through conventional means and may be provided with the usual controls. The details of the heater construction are not claimed herein. Reference may be had to my copending applications Serial No. 452,014, filed July 23, 1942 which matured into Patent No. 2,337,484 on December 21, 1943; Serial No. 464,451, filed November 4, 1942 which matured into Patent No. 2,380,602 on July 17, 1945; and Serial No. 472,458, filed January 15, 1943, for the detailed construction of representative forms of heat exchangers and associated parts which may be incorporated in the apparatus disclosed herein.

It will be noted that the air inlet conduit 32 terminates at a point along the external surface of the fuselage at which the air flow is at low velocity and in a direction substantially perpendicular to the tube opening, whereas, the discharge conduit 34 terminates in a high velocity portion of the air stream and is conformed to be responsive to the reduced pressure due to the velocity of flow of air past it. There is thus a pressure differential produced which causes air flow into the inlet tube 32 through the preheating tube 30, conduit 28, carbureting device 26, induction tube 24, and thence through the heat exchanger and exhaust conduit 34. Throughout this path of flow the pressure is at all times lower than that of the atmosphere.

On the other hand, the pressure of the ventilating air within the casing 12 is at all times above atmospheric pressure since it is in substantially free communication with the inlet opening of the ram 16 at which the pressure is always above atmospheric pressure to an extent depending upon the air speed of the plane. Thus, the ventilating air pressure within the casing 12 is always higher than that of the products of combustion which are within the heat exchanger, and any accidental perforation of the wall of the heat exchanger whether due to corrosion, vibration, or enemy action, will result merely in the admixture with the products of combustion within the heat exchanger of some of the ventilating air, and there will be no possibility of any of the gaseous products of combustion being mixed with the heated ventilating air flowing through the duct 20. It will be understood that while the plane is stationary, the heater cannot be placed in operation, since the flow of combustible mixture to the combustion chamber, as well as the flow of ventilating air, depend upon the differential pressures produced as a result of movement of the plane through the air.

While I have shown and described a particular embodiment of the invention, it will be apparent to those skilled in the art that it is capable of embodiment in various forms. I therefore desire, by the following claims, to include within the scope of my invention all such variations and modifications whereby substantially the results of my invention may be obtained by the use of substantially the same or equivalent means.

I claim:

1. In a heating apparatus for an aircraft having a skin sheet, the combination of an internal combustion type heater located within the aircraft adjacent the skin sheet and having a combustion chamber and heat exchanger, means extending through the skin sheet and having a ram opening subject to the dynamic air pressure of the relative wind during flight of the aircraft for supplying ventilating air under greater than atmospheric pressure to said heat exchanger, a conduit for supplying air for combustion in said combustion chamber, said conduit extending through the skin sheet and having an opening to the atmosphere which is at substantially static atmospheric pressure at all times, and an exhaust conduit for conveying products of combustion from said heater to the atmosphere, said exhaust conduit extending through the skin sheet and having a suction producing termination at a point outside of but adjacent the skin sheet, whereby under all conditions of operation the pressure of the products of combustion within the heat exchanger will be at less than atmospheric pressure and the ventilating air at said heat exchanger will be at a pressure higher than that of the atmosphere.

2. In a heating apparatus for an aircraft having a skin sheet, the combination of an internal combustion type heater located within the aircraft adjacent the skin sheet and having a combustion chamber and heat exchanger, means extending through the skin sheet having a ram opening subject to dynamic air pressure during flight of the aircraft for supplying ventilating air under greater than atmospheric pressure to the combustion chamber and heat exchanger, means extending through the skin sheet for supplying air for combustion in said combustion chamber at substantially atmospheric pressure at all times, and an exhaust conduit extending through the skin sheet for conveying products of combustion from the heat exchanger to the atmosphere, said exhaust conduit terminating in a shape such that the flow of relative wind past it will produce a pressure therein lower than atmospheric pressure, whereby the pressure of the products of combustion within the combustion chamber and heat exchanger will be less than atmospheric pressure and the ventilating air at said heat exchanger will be at a pressure higher than that of the atmosphere while the heater is in operation.

HENRY J. De N. McCOLLUM.